United States Patent [19]

Valentin et al.

[11] 3,933,038

[45] Jan. 20, 1976

[54] VOLUMETRIC DETERMINATION OF CONTAMINATED LIQUID OR GASEOUS MEDIA

[75] Inventors: Hans Wilhelm Valentin, Hurth-Knapsack; Kurt Schmeiser, Cologne; Paul Beuth, Hurth, all of Germany

[73] Assignee: Hoechst Aktiengesellschaft, Frankfurt am Main, Germany

[22] Filed: June 28, 1974

[21] Appl. No.: 484,139

[30] Foreign Application Priority Data
July 30, 1973  Germany............................ 2338622

[52] U.S. Cl..................................... 73/194 R; 73/3
[51] Int. Cl.²......................................... G01F 25/00
[58] Field of Search............... 73/194 R, 195, 196, 3

[56] References Cited
UNITED STATES PATENTS

| | | | |
|---|---|---|---|
| 2,314,152 | 3/1943 | Mallory | 73/196 |
| 3,324,707 | 6/1967 | Charbonnier | 73/3 |
| 3,340,386 | 9/1967 | Hurst | 73/194 R |

*Primary Examiner*—James J. Gill
*Assistant Examiner*—Anthony V. Ciarlante
*Attorney, Agent, or Firm*—Connolly and Hutz

[57] ABSTRACT

The volume of liquid or gaseous media contaminated with solids is measured discontinuously. To this end, an accurately measured volume of a pure medium is passed through a measuring device intended for measuring the volume of a contaminated medium. The number of the pulses produced by the passage of the pure medium through the measuring device is stored. The contaminated medium is thereupon passed through the measuring device until the number of pulses transmitted by the measuring device corresponds to the stored number of pulses. To further improve the accuracy in measurement, it is possible for the same amount of the pure medium to be passed once again through the measuring device. The number of pulses thereby produced is stored and compared with the number of pulses produced and stored on the first passage of the pure medium through the measuring device. The number of pulses last stored is modified by half the difference between the two numbers of pulses stored. In the next following metering cycle, contaminated medium is passed through the measuring device until the number of pulses produced by the measuring device corresponds to the number of pulses modified.

8 Claims, 19 Drawing Figures

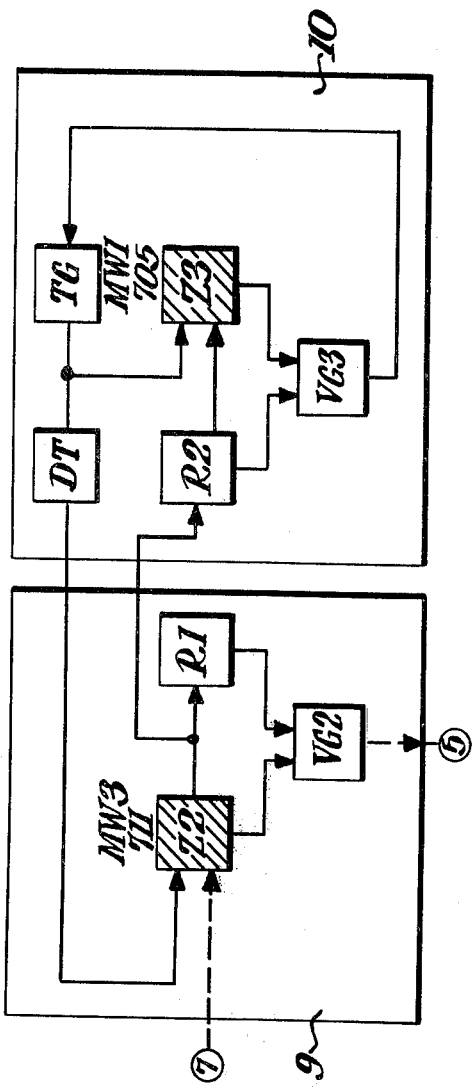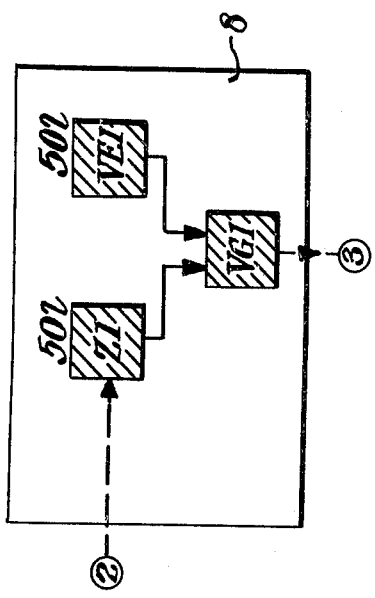
Fig.13.

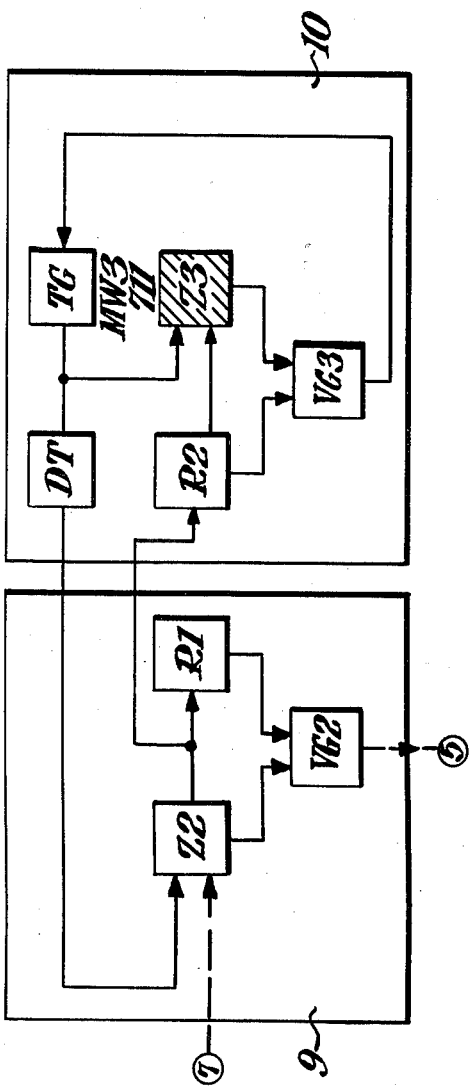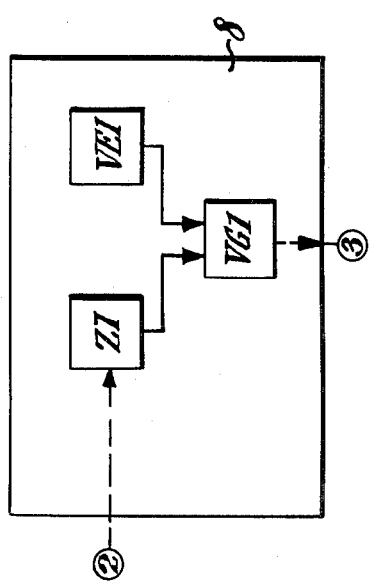
Fig.18.

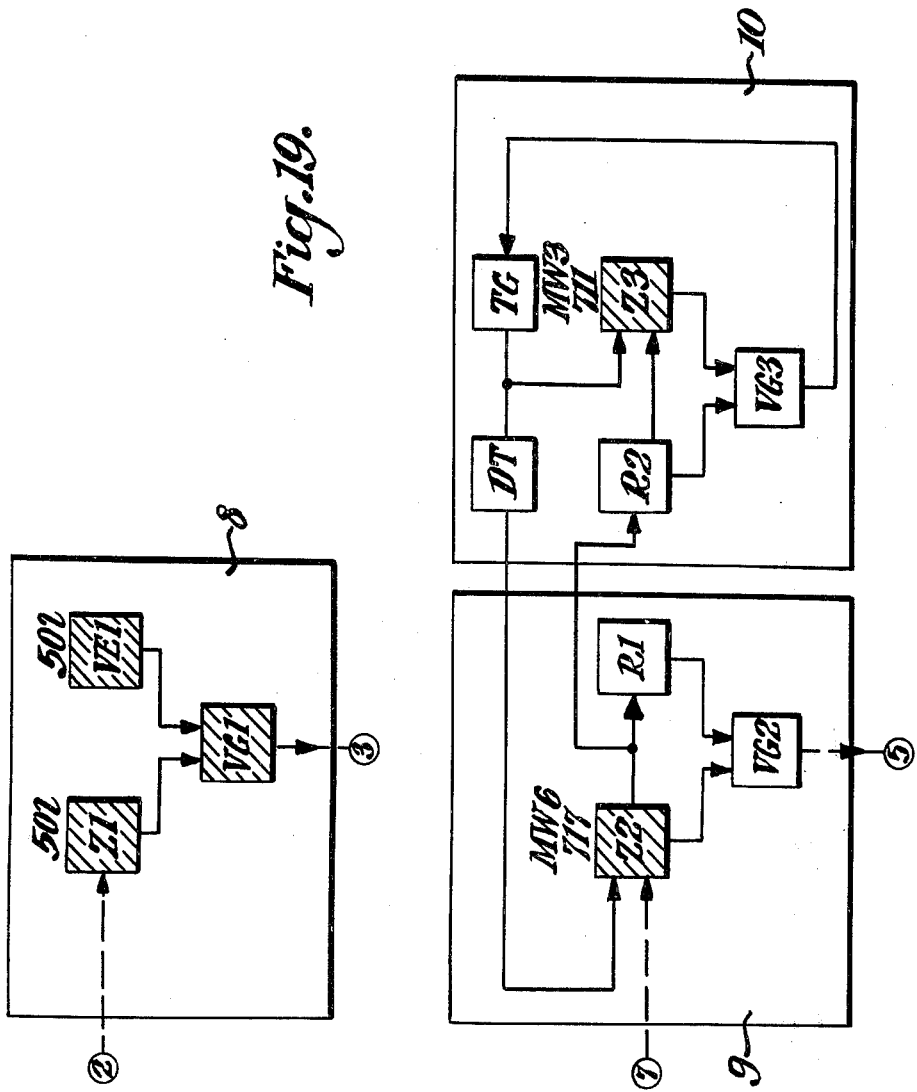

VOLUMETRIC DETERMINATION OF CONTAMINATED LIQUID OR GASEOUS MEDIA

The present invention relates to a method for the discontinuous measurement of the volume of liquid or gaseous media contaminated with solids, and also to an apparatus for carrying out the method of the invention.

In the measurement of the volume of liquid or gaseous media contaminated with the solids the measuring devices, such as for example oval gear meters, are soiled by depositions to such an extent that correct measuring is no longer possible with these measuring devices. For media of this kind the expedient is frequently adopted of utilising measuring devices, such as for example Venturi tubes, which are less sensitive to depositions, even if their accuracy of measurement leaves much to be desired and may be still further impaired in each subsequent metering operation because of further depositions in the measuring device. Even frequent rinsing out of the measuring device between metering operations does not ensure that practically constant conditions are maintained in respect of deposition in the measuring device.

The problem underlying the invention therefor consists in providing a method for the discontinuous measurement of the volume of liquid or gaseous media contaminated with solids, and also an apparatus for carrying out this method, wherein the influence of fouling, which is caused by the contaminated medium, on the volume measurement is detected and taken into account for each metering cycle by corresponding correction. According to the invention this is achieved by first passing a pure medium, the volume of which has already been accurately measured, through the measuring device intended for measuring the volume of contaminated medium, storing the number of pulses produced by the flow of the pure medium through the measuring device, and thereupon allowing contaminated medium to flow through the measuring device until the number of pulses transmitted by the latter corresponds to the stored number.

The method of the invention may also optionally be characterised in that the same accurately measured amount of the pure medium is again passed through the measuring device, the number of pulses thereby produced is stored, this number of pulses is compared with the number of pulses produced by the measuring device and stored on the first passage of the pure medium, the number of pulses last stored is modified by half the difference between the two stored numbers of pulses, and in the following metering contaminated medium is passed through the measuring device until the number of pulses thereby produced by the latter corresponds to the modified number of pulses.

The apparatus for carrying out the method will first be explained with the aid of the accompanying drawings in which:

FIGS. 9–19 are binary functional diagrams of the operation of this invention where the measuring conditions vary considerably during measurement of the pure and contaminated mediums.

Figure 1:
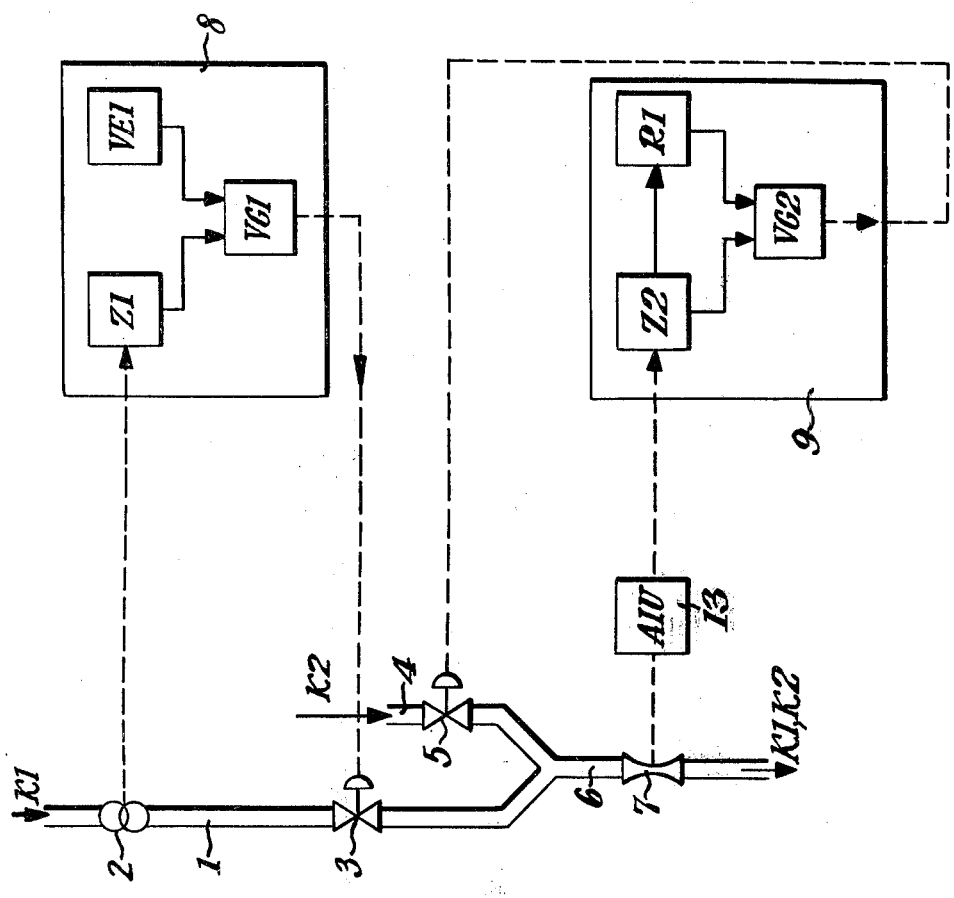
FIGS. 1–3 are schematic diagrams including apparatus which is one embodiment of this invention and binary functional diagrams illustrating operation of one embodiment of the process invention thereby.
Figure 2:
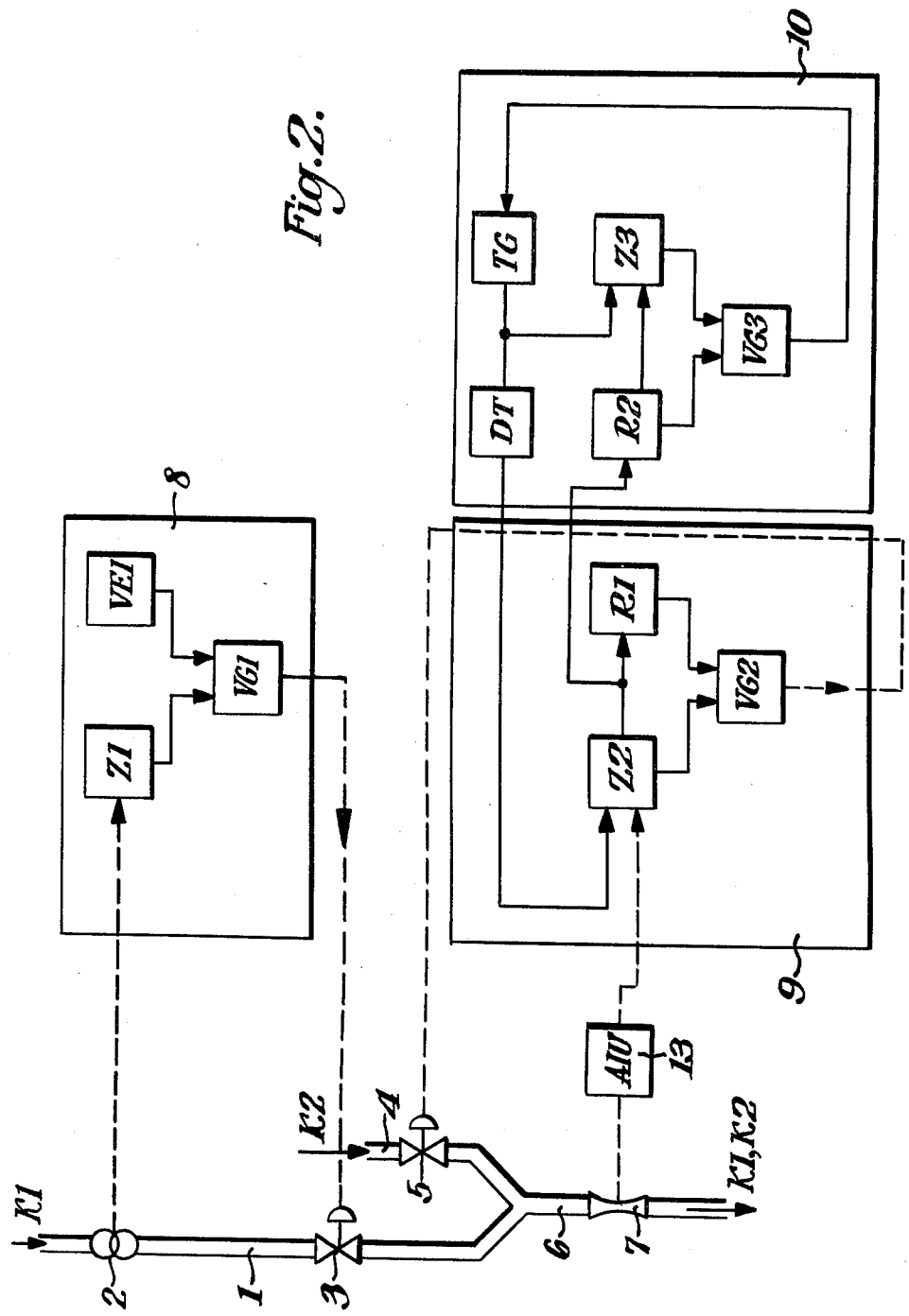
Figure 3:
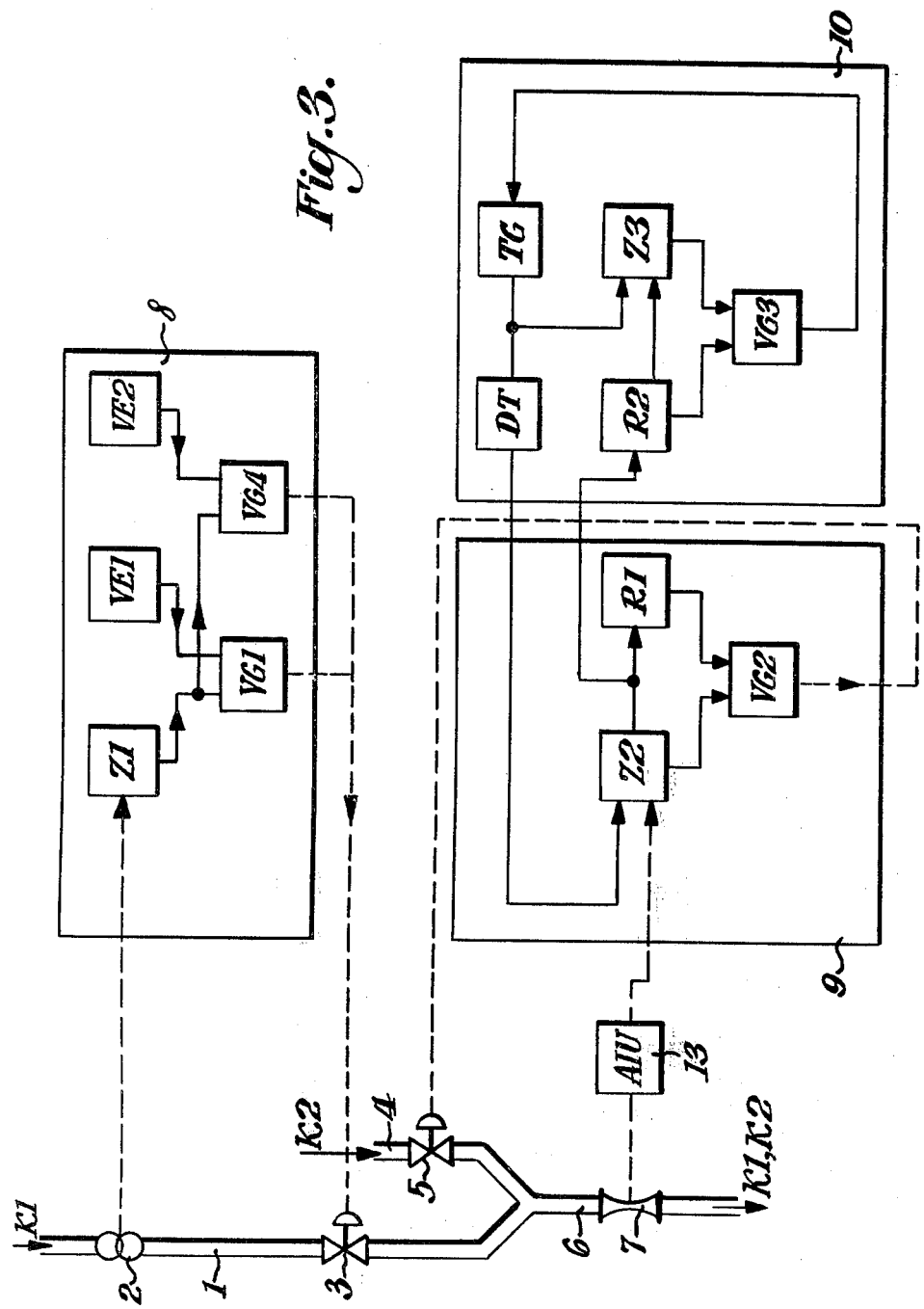

In the latter, FIGS. 1 to 4 shows on the left-hand side a diagram of piping with fittings, while on the right-hand side in each case different binary linked function modules are indicated diagrammatically. The piping diagrams and fittings are identical in FIGS. 1 to 3, while in FIG. 4 a modified arrangement for a special kind of metering is shown. An installation of the kind shown in FIG. 3 is used when it is desired to meter amounts of pure medium K1 and medium K2 contaminated with solids which are not equal in magnitude. With the aid of the presetter VE2 it is then possible to preselect the additional amount of pure medium K1. The comparator VG4 compares the quantity pulses recorded in the meter Z1 with the residual amount of pure medium K1 preselected in presetter VE2, and closes the valve 3 when equality of the two values is determined.

Figure 4:
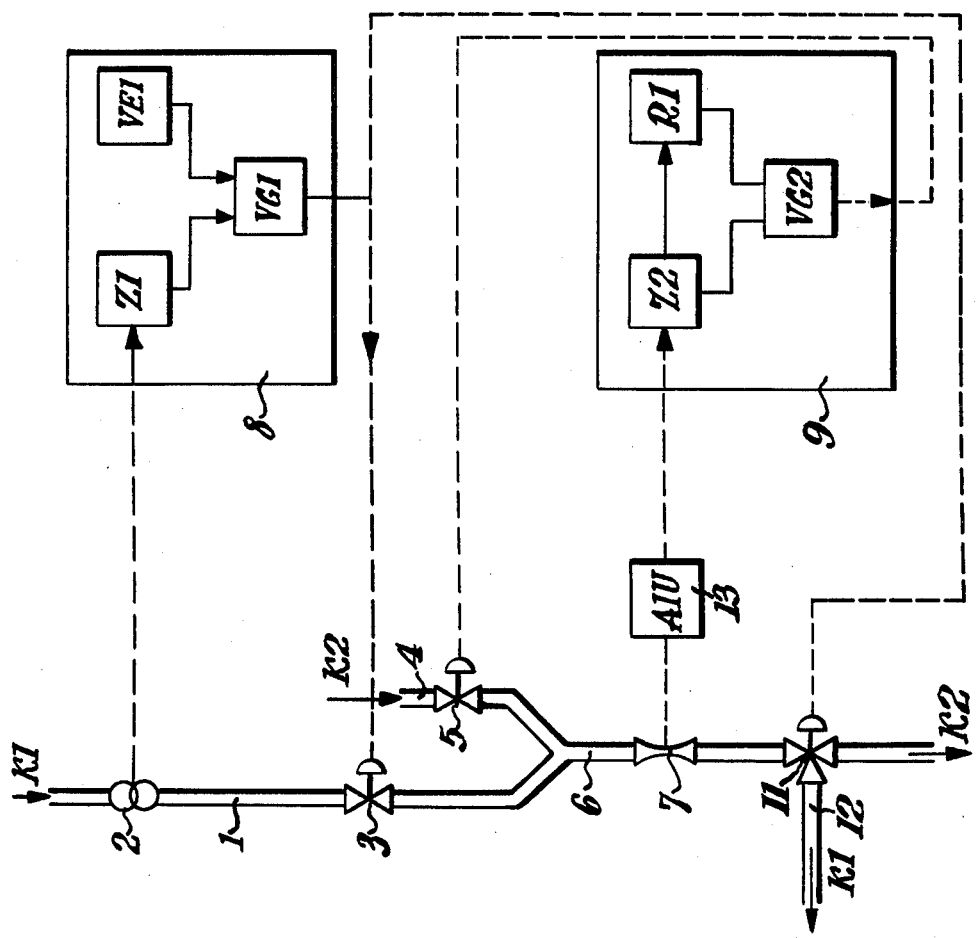
FIG. 4 is a schematic diagram similar to FIGS. 1–3 for modified forms of the apparatus and process invention.

An installation of the kind shown in FIG. 4 is used when only contaminated medium K2 is to be metered or measured, in which case the pure medium K1 necessary for the comparison measurement is branched off from the pipe 7 with the aid of the three-way valve 11 and discharged through the pipe 12.

The pipe 1 contains an oval gear meter 2 and, downstream in the direction of flow, a valve 3 adapted to be automatically operated. A pipe 4 contains a valve 5 adapted to be automatically operated. The pipes 1 and 4 lead into another pipe 6 containing a Venturi tube 7 with an analog pulse converter 13. Downstream of the Venturi tube 7 the pipe 6 may additionally contain a three-way valve 11 which is adapted to be automatically operated and has a lateral pipe 12 (FIG. 4). In this case the pipe 1 can receive pure medium K1 and the pipe 4 medium K2 contaminated with solids. Whereas the medium K2 always leaves the system by way of pipe 7, the medium K1 may either pass out there (FIGS. 1 to 3) or leave the system by way of the pipe 12 (FIG. 4).

A processing unit 8 contains a counter Z1, a comparator VG1, and a presetter VE1 (FIGS. 1, 2 and 4); in addition, another comparator VG4 and another presetter VE2 (FIG. 3) may be provided. In this arrangement the oval gear meter 2 is connected to the counter Z1 and the comparator VG1 or the comparators VG1 and VG4 is or are connected to the valve 3 which is adapted to be automatically operated.

A processing unit 9 contains a comparator VG2, which is linked to a counter Z2 and a register R1, the counter Z2 being fed by the analog pulse converter 13 with quantity pulses from the preceding measuring arrangement (Venturi tube 7) and the comparator VG2 automatically triggering the operation of the valve 5.

A processing unit 10 contains a register R2, a counter Z3, a comparator VG3, a divider DT, and a clock generator TG, the register R2 and the divider DT being connected to the counter Z2 in the processing unit 9 (FIGS. 2 and 3).

More specifically, the installation for carrying out the method of the invention is characterised by a pipe 1 containing a flowmeter suitable for the accurate metering of a pure medium K1 and an automatic valve 3; by a pipe 4 containing an automatic valve 5, the pipes 1 and 4 leading into another pipe 6 in which is provided a flow meter 7 suitable for metering a contaminated medium K2; by a processing unit 8 containing a counter Z1, a presetter VE1, and a comparator VG1, the counter Z1 being connected to the flowmeter 2 and the comparator VG1 to the automatic valve 3, while the comparator VG1 is connected to the counter Z1 and the presetter VE1 and closes the automatic valve 3 when the amount of pure medium adjusted in the presetter VE1 has passed through the flowmeter 2; and by a processing unit 9 containing a counter Z2 a register R1, and the comparator VG2, the counter Z2 being connected to the flowmeter 7 and the comparator VG2 to the automatic valve 5, while the comparator VG2 is connected to the counter Z2 and the register R1 and closes the automatic valve 5 when the amount of contaminated medium which has flowed through the flowmeter 7 has produced the number of pulses which is equal to the number of pulses stored in the register R1 from the preceding passage of the amount of pure medium through the flowmeter 7.

The installation is further characterised by a pipe 1 containing a flowmeter 2 suitable for the accurate metering of a pure medium K1 and an automatic valve 3; by a pipe 4 containing an automatic valve 5, the pipes 1 and 4 leading into another pipe 6 containing a flowmeter 7 suitable for metering a contaminated medium K2; by a processing unit 8 containing a counter Z1, a presetter VE1 and a comparator VG1, the counter Z1 being connected to the flowmeter 2 and the comparator VG1 to the automatic valve 3, while the comparator VG1 is connected to the meter Z1 and the presetter VE1 and closed the automatic valve 3 when the amount of pure medium adjusted in the presetter VE1 has passed through the flowmeter 2; by a processing unit 9 containing a counter Z2, a register R1, and a comparator VG2, the counter Z2 being connected to the flowmeter 7 and the comparator VG2 to the automatic valve 5, while the comparator VG2 is connected to the counter Z2 and the register R1 and closes the automatic valve 5 when the amount of contaminated medium which has passed through the flowmeter 7 has produced the number of pulses which is equal to the number of pulses stored in the register R1 from the preceding passage of the amount of pure medium through the flowmeter 7; and by a processing unit 10 containing a register R2, a counter Z3, a comparator VG3, a clock generator TG and a divider DT, the divider DT being connected to the clock generator TG, the counter Z3, and the counter Z2 of the processing unit 9, and the register R2 being connected to the counter Z3, the comparator VG3, and the register R1 and also to the counter Z2 of the processing unit 9, while the comparator VG3 is connected to the clock generator TG.

In addition, the installation may selectively be characterised in that:

a. in the processing unit 8 another presetter VE2 and another comparator VG 4 are provided, the comparator VG4 being connected to the presetter VE2, the counter Z1, and the comprator VG1 and also to the automatic valve 3;

b. a downstream of the flowmeter 7 the pipe 6 contains an automatic three-way valve 11 with a pipe 12, the three-way valve 11 connected to the comparator VG1 diverting the medium into the pipe 12 when the automatic valve 3 is open;

c. the flowmeter 2 is an oval gear meter;

d. the flowmeter 2 is an annular piston meter;

e. the flowmeter 7 is a Venturi tube, while between the latter and the counter Z2 of the processing unit 9 an analog pulse converter 13 is connected;

f. the flowmeter 7 is an orifice, an analog pulse converter 13 being connected between the orifice and the counter Z2 of the processing unit 9.

The operating cycle will be explained more fully with reference to FIGS. 5 to 19. FIGS. 5 to 8 illustrate the operating cycle for the case where the measuring conditions vary only slightly during a measurement of the contaminated medium, whereas FIGS. 9 to 19 illustrate the operating cycle in cases where the variation of measuring conditions during a measurement of the pure and contaminated medium is not negligible.

Figure 5:
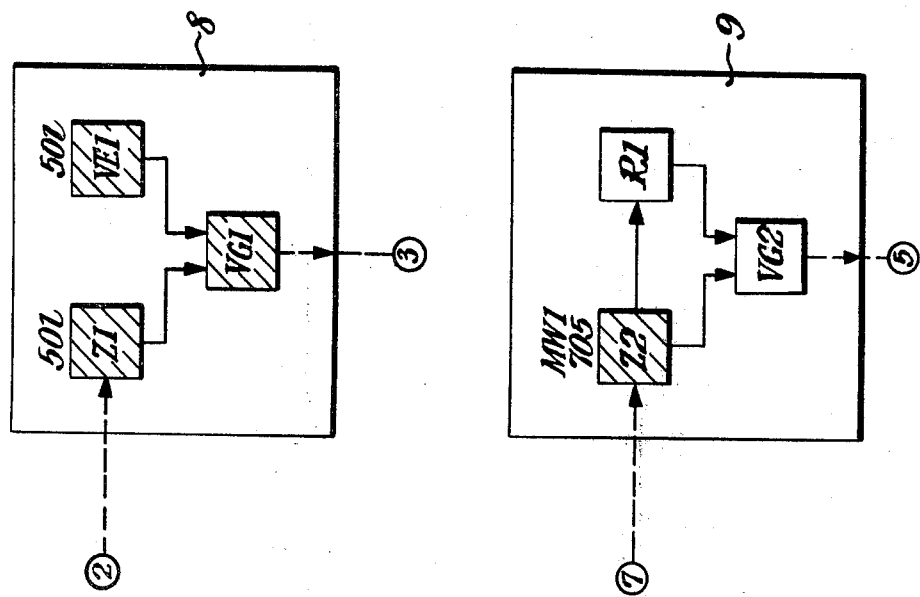
FIGS. 5–8 are binary functional diagrams of the operation of this invention where the measuring conditions vary only to a slight amount during measurement of the pure and contaminated mediums.

In FIGS. 5 to 19 the various function modules in operation in the processing units are hatched; the references have the same meanings as in FIGS. 1 to 4. The process according to FIGS. 5 to 8, in which an installation of the kind shown in FIG. 1 is used, takes place as follows:

FIG. 5: A quantity, for example 50 litres, is first preselected in the presetter VE1. The valve 3 thereupon opens and pure medium K1 flows until 50 litres have passed through the oval gear meter 2, which is detected by the comparator VG1 which then effects the closing of the valve 3. This amount of pure medium K1 has however also passed through the Venturi tube 7 and by means of the analog pulse converter has recorded a quantity value MW1 in the counter Z2, for example 705 pulses.

Figure 6:
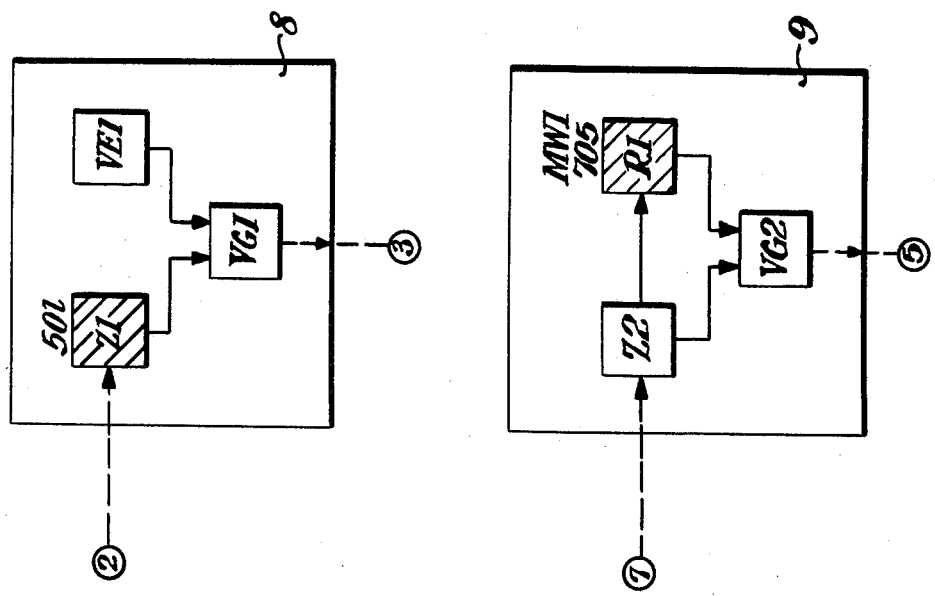

FIG. 6: The quantity value MW1 is transferred from the counter Z2 to the register R1.

Figure 7:
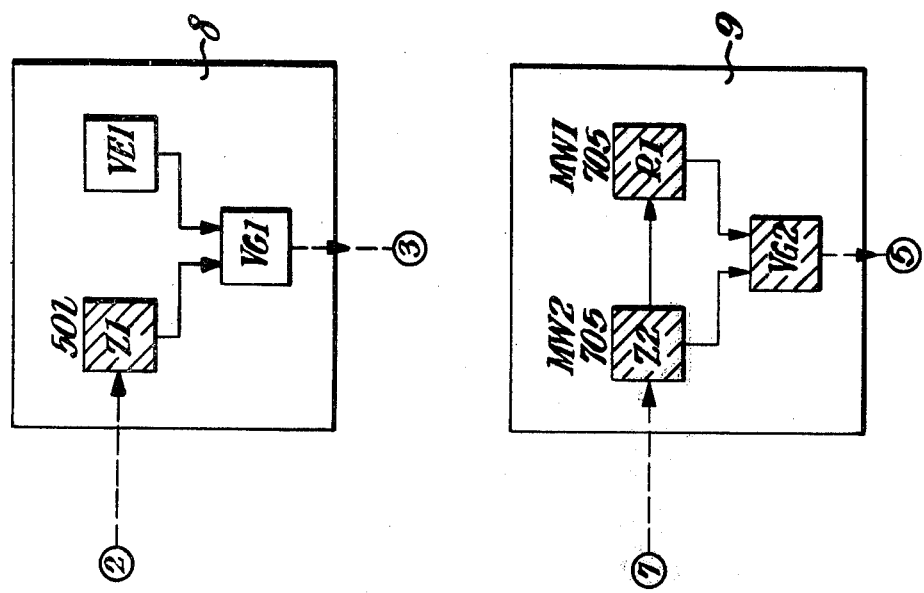

FIG. 7: After the valve 5 has been opened, contaminated medium K2 flows through the Venturi tube 7 until the quantity valve MW2 counted in the counter Z2 corresponds to the valve MW1 stored in the register R1. The comparator VG2 thereupon gives the command for the closing of the valve 5.

Figure 8:
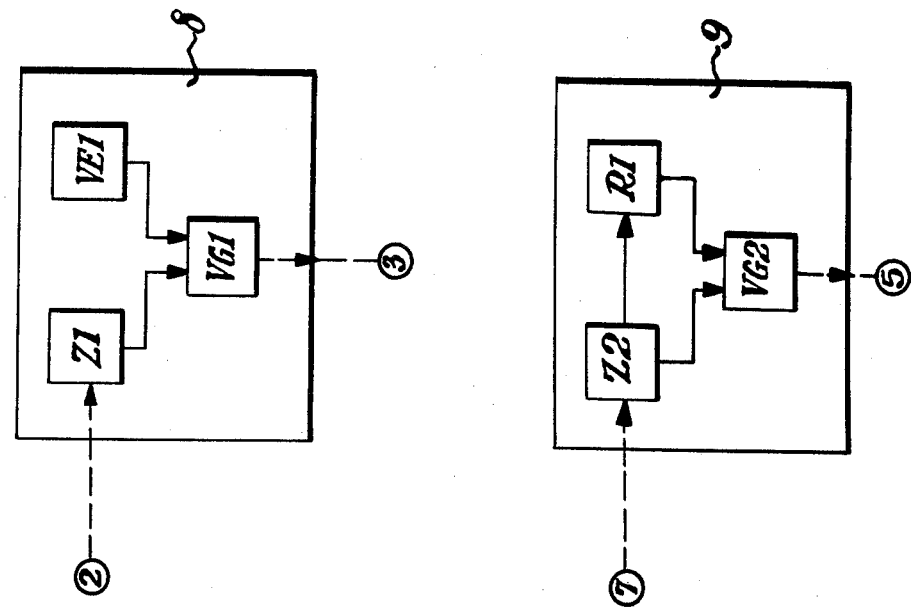

FIG. 8: All stored measurements are erased. The installation is thereupon ready for operation for a new metering cycle.

Figure 9:
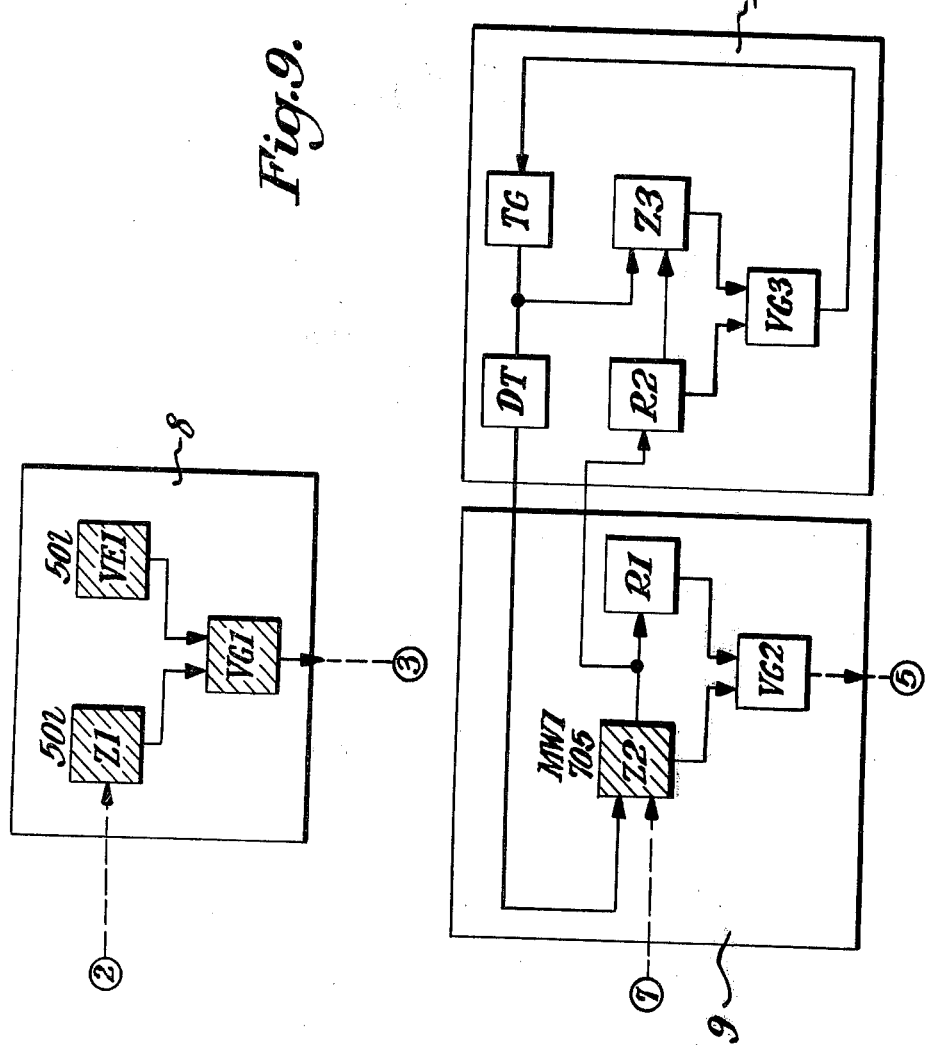

The process according to FIGS. 9 to 19, in which an installation of the kind shown in FIG. 2 is used, takes place as follows:

FIG. 9: As in the case of FIG. 5, a preselected amount of pure medium K1, for example 50 litres, first passes through the oval gear meter 2 and the Venturi tube 7, so that in the counter Z2 a quantity value MW1, for example 705 pulses, is counted.

Figure 10:
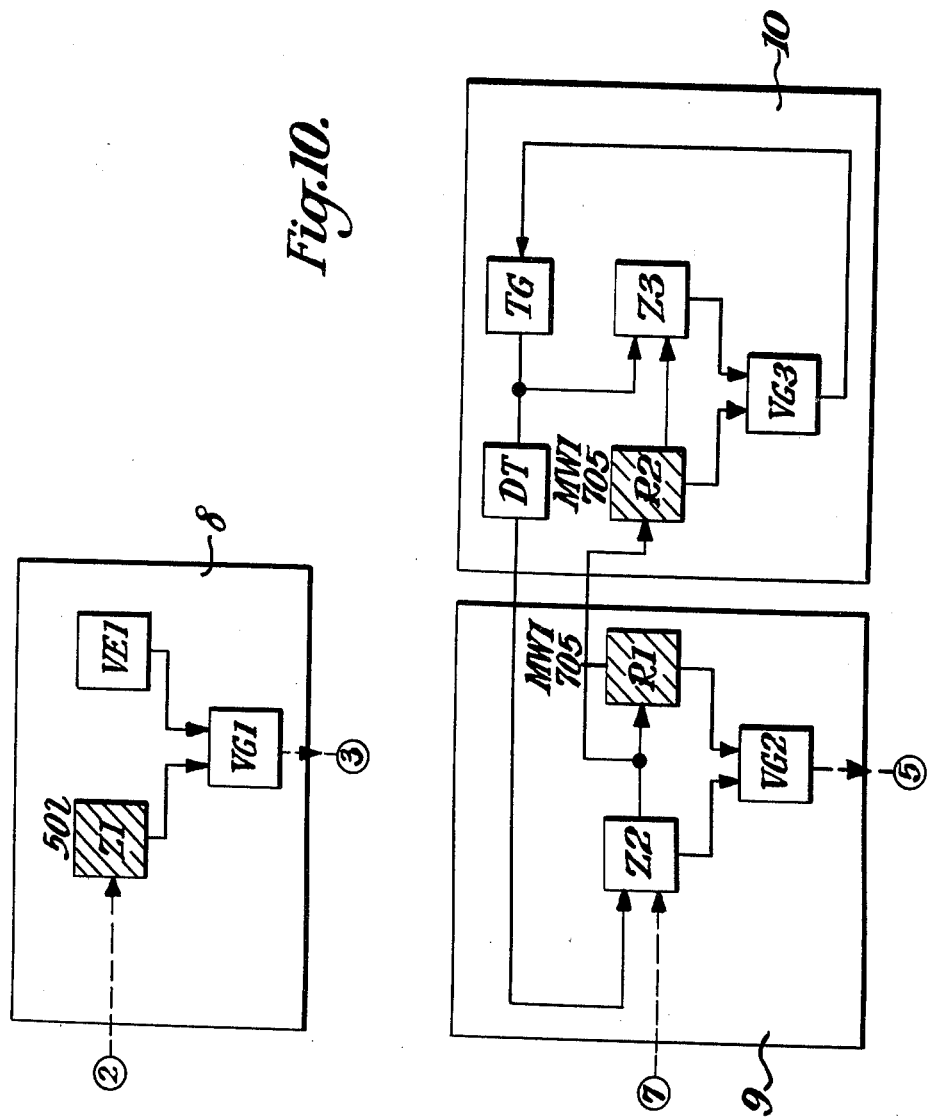

FIG. 10: The quantity value MW1 is transferred from the counter Z2 to the registers R1 and R2.

Figure 11:
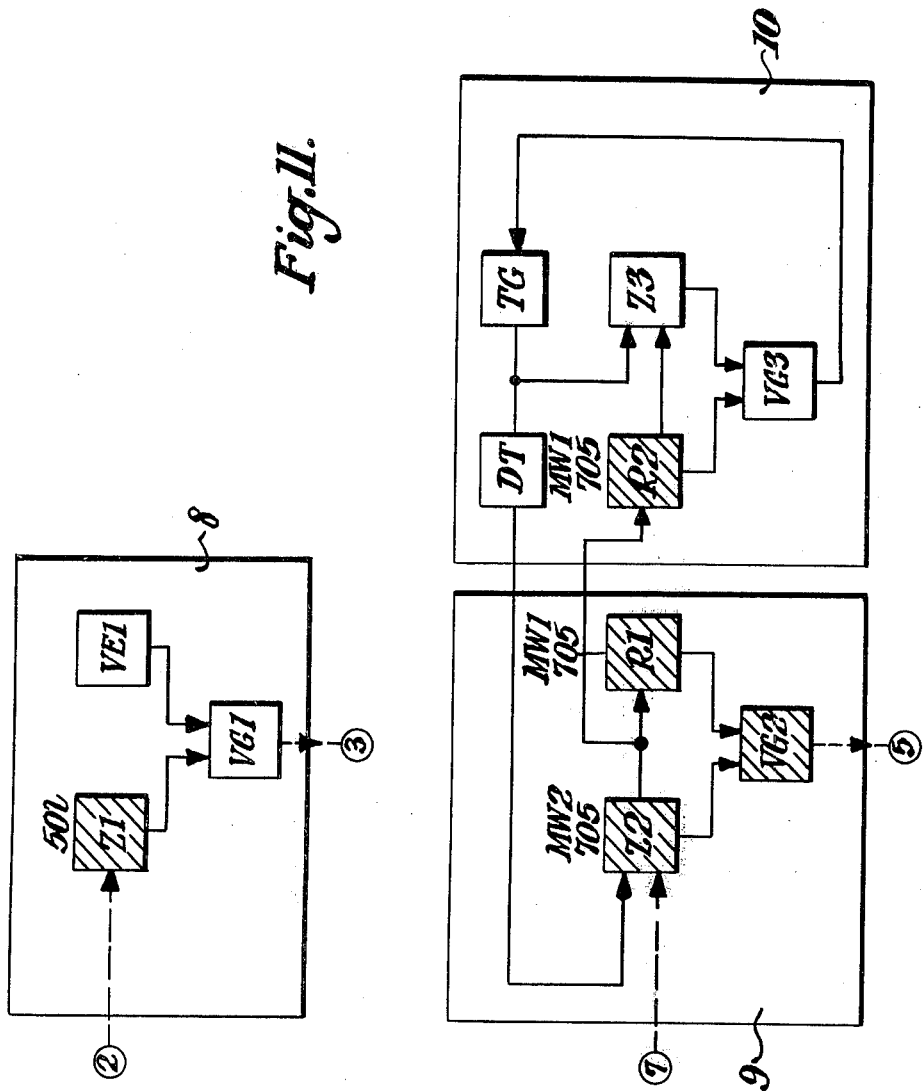

FIG. 11: After the opening of the valve 5, contaminated medium K2 flows through the Venturi tube 7 until the quantity value MW2 counted in the counter Z2 corresponds to the value MW1 stored in the register R1. The comparator VG2 then closes the valve 5.

Figure 12:
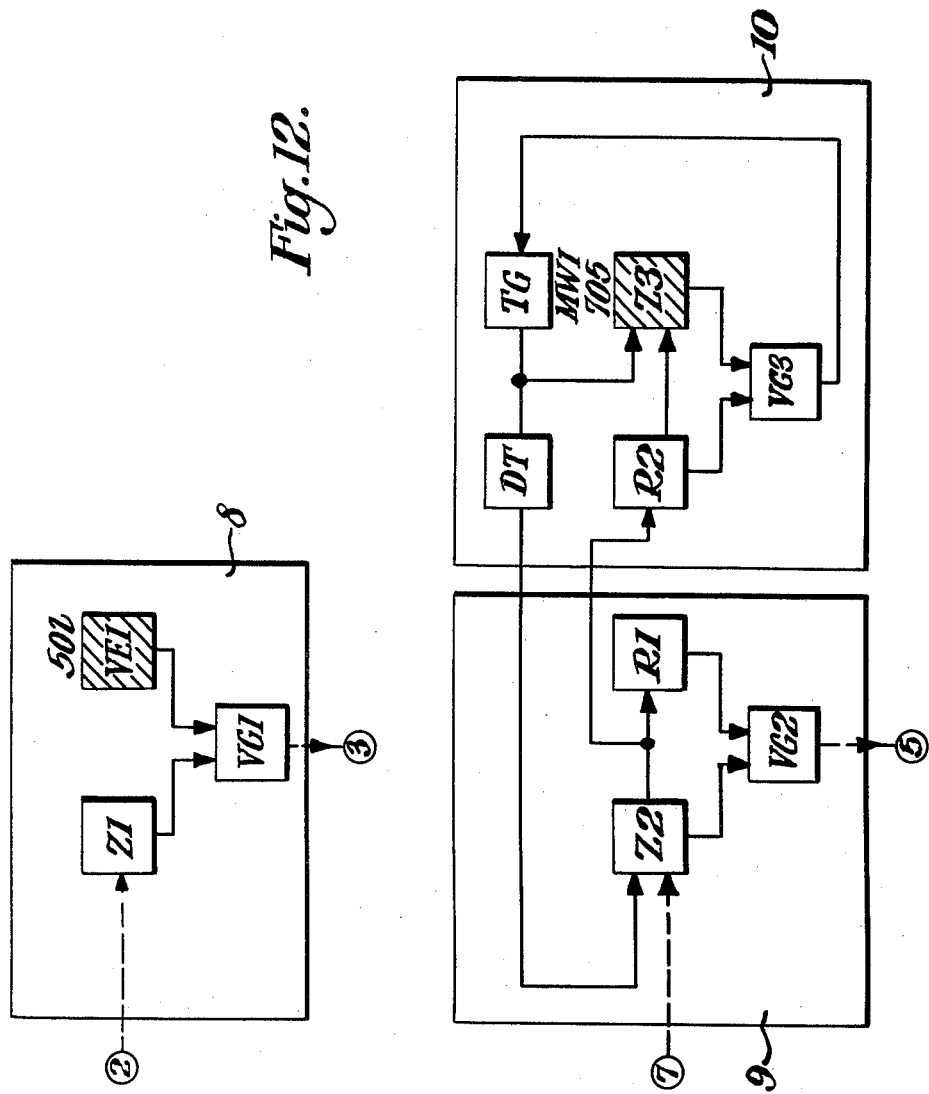

FIG. 12: The quantity value MW1 is transferred from the register R2 to the counter Z3. The counters Z1 and Z2 and also the registers R1 and R2 are cleared. In the presetter VE1 the previously preselected amount in accordance with FIG. 9, for example 50 litres, remains adjusted.

FIG. 13: On the passage of this same amount of pure medium K1 through the Venturi tube 7 as in the case of FIG. 9, a different quantity value MW3, for example 711 pulses, is counted in the counter Z2 as the result of depositions in the Venturi tube 7.

Figure 14:
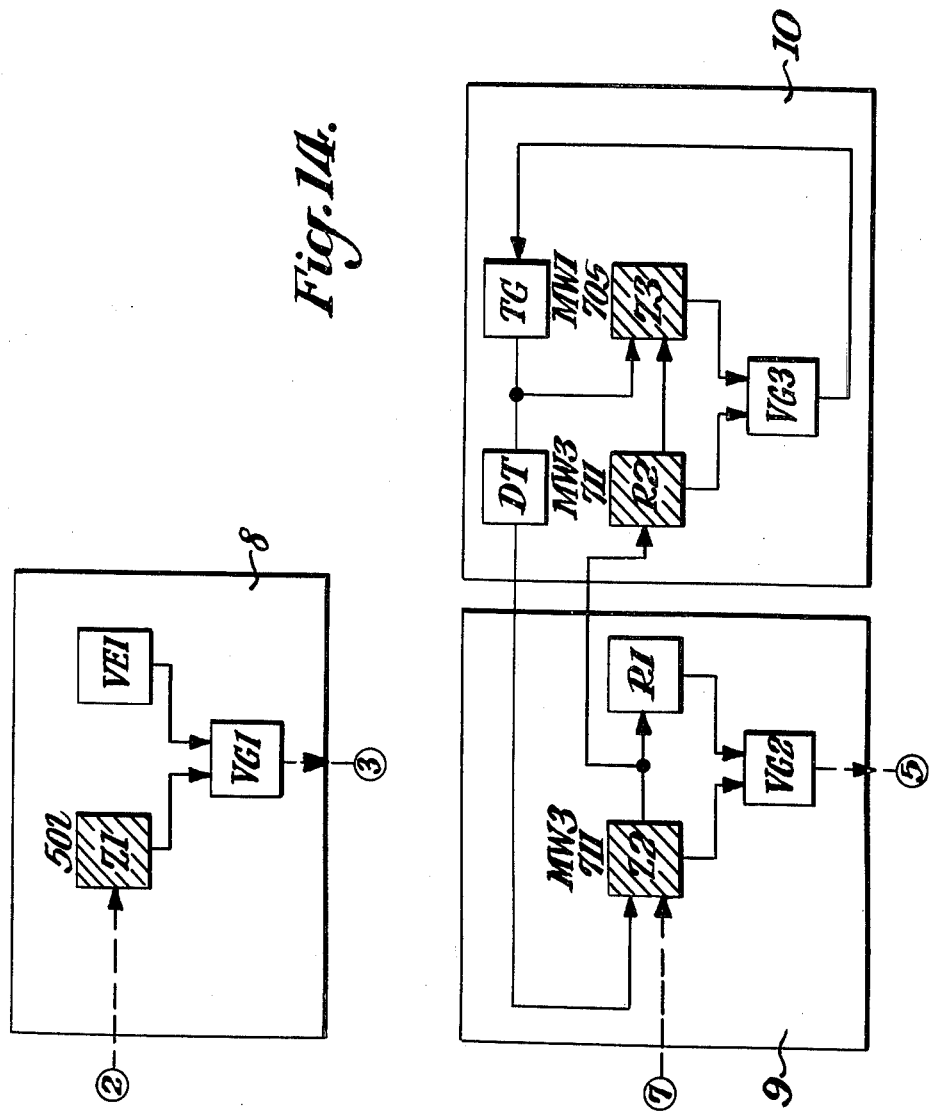

FIG. 14: The correction for the next metering of the contaminated medium K2 is prepared by the transfer of the quantity value MW3 to the register R2.

Figure 15:
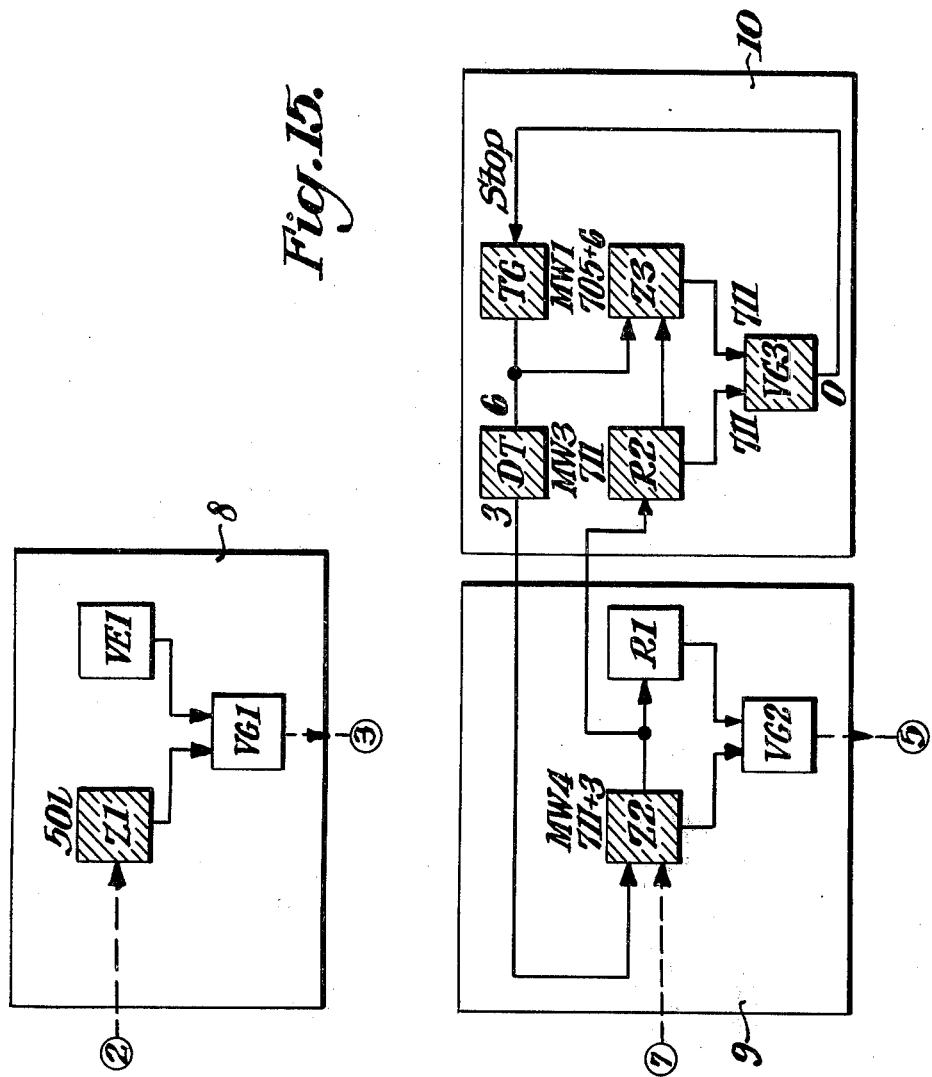

FIG. 15: With the aid of the clock generator TG and of the comparator VG3 the difference between the pulses stored in the register R2 and in the meter Z3, for example 6 is determined and fed to the divider DT. The output pulses of the divider DT, that is to say half the input pulses in the case of the dual divider, namely three pulses in the example given, are added. The new quantity value is designated MW4.

Figure 16:
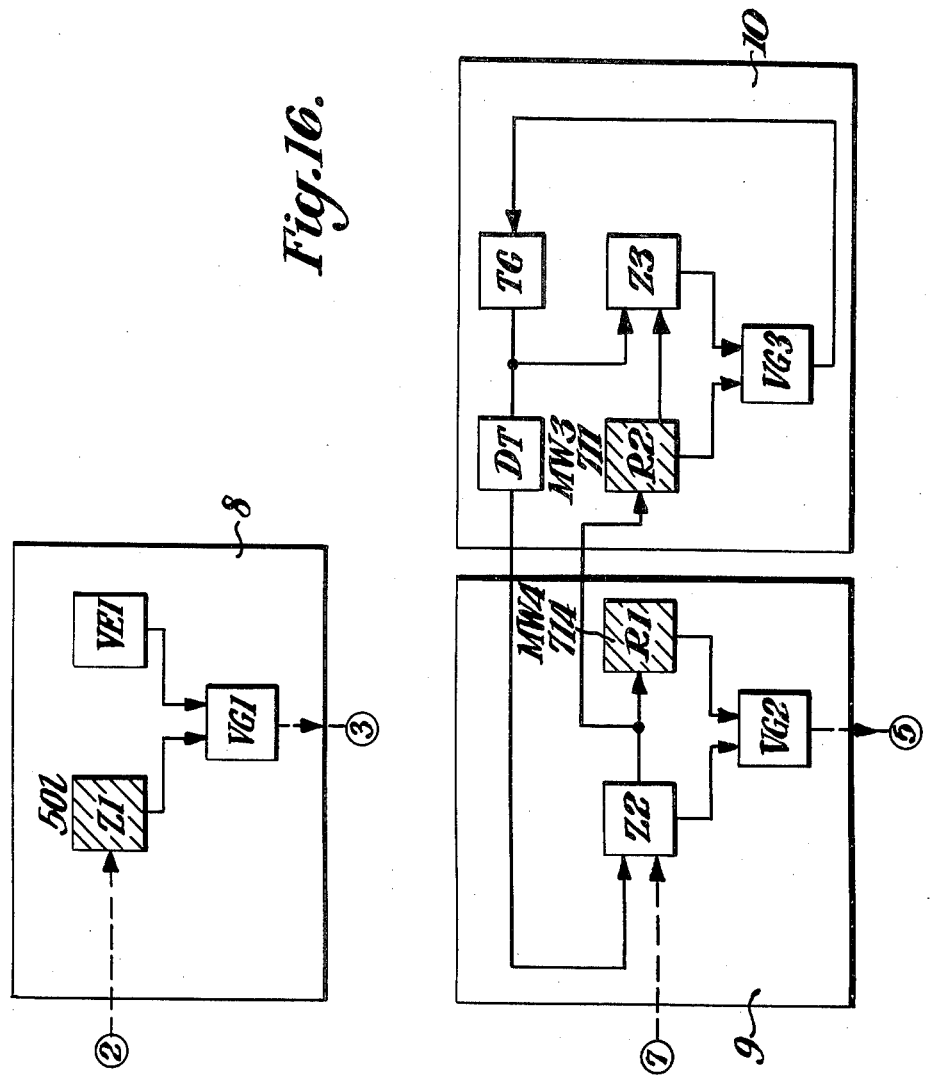

FIG. 16: The corrected number of pulses MW4 of the counter Z2, for example 714 pulses, is transferred to the register R1. The counters Z2 and Z3 are cleared.

Figure 17:
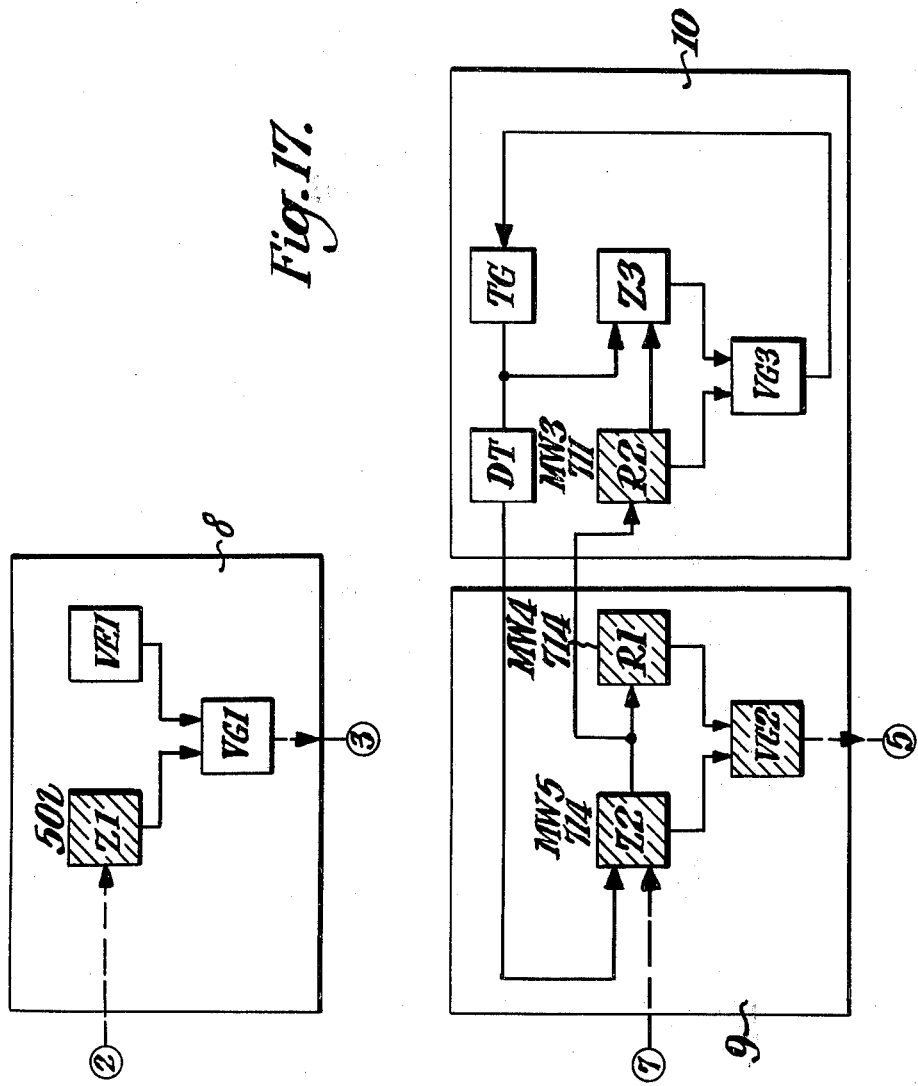

FIG. 17: After the opening of the valve 5, contaminated medium K2 then flows through the Venturi tube 7 until the quantity value MW5 counted in the counter Z2 corresponds to the value MW4 stored in the register R1, for example 714 pulses, which is detected by the comparator VG2. The comparator VG2 then closes the valve 5.

FIG. 18: The quantity value MW3 is transferred from the register R2 to the counter Z3. The other function modules are cleared.

FIG. 19: When a preselected amount of pure medium K1, for example 50 liters, again passes through the Venturi tube 7, once again a different quantity value of MW6, for example 717 pulses, is counted in the counter Z2 as the result of further depositions.

The method of the invention can for example be applied to the metering of contact mass suspended in inert liquid (contaminated medium K2) which is used for the polymerisation of unsaturated hydrocarbons, in which case the inert liquid used may be motor spirit. Motor spirit then also serves as pure medium K1.

The method of the invention may for example also be used for volume measurement of carbide furnace gas charged with dust and moisture (contaminated medium K2), in which case the measuring device is calibrated from time to time with nitrogen (pure medium K1).

We claim:

1. A method for the discontinuous measurement of the volume of liquid and gaseous media, respectively, contaminated with solids, by alternately flowing a pure medium of an accurately measured volume and a contaminated medium of unknown volume which is to be measured through a measuring device delivering its measured results in the form of pulses; storing the number of pulses delivered by the passage of said pure medium through the measuring device; flowing contaminated medium through the measuring device until the number of pulses delivered by the measuring device corresponds to the number of stored pulses; flowing said pure medium through the measuring device and storing the number of pulses delivered; comparing the last number of pulses stored with the number of pulses delivered and stored on the previous passage of said pure medium through the measuring device; modifying the number of pulses last stored by half the difference between the two stored numbers of pulses; and passing, in the next following metering cycle, contaminated medium through the measuring device until the number of pulses delivered by the measuring device corresponds to the modified number of pulses.

2. An apparatus for the discontinuous measurement of the volume of liquid and gaseous media, respectively, contaminated with solid matter, the apparatus comprising a. a first pipe provided with a first flowmeter permitting the supply of metered quantities of a pure medium and with a first automatically actuated valve; a second pipe provided with a second automatically actuated valve, the first pipe and the second pipe leading into a third pipe provided with a second flow meter permitting the supply of metered quantities of a contaminated medium;

b. a first processing unit comprised of a first counter connected to the first flow meter in said first pipe; a first presetter, and a first comparator; said first comparator being connected to the first automatically actuated valve, to the first counter and to the first presetter, and closing the first automatically actuated valve in said first pipe when a quantity of pure medium adjusted in the first presetter has passed through the first flowmeter;

c. a second processing unit comprised of a second counter connected to the second flowmeter in said third pipe, a first register, and a second comparator; the second comparator being connected to the second automatically actuated valve, to the second counter and to the first register, and closing the second automatically actuated valve in said second tube when an amount of contaminated medium which has passed through the second flowmeter in said third pipe has produced a number of pulses which is equal to the number of pulses stored in the first register from the previous passage of the quantity of pure medium through the second flowmeter;

d. a third processing unit comprised of a second register, a third counter, a third comparator, a clock generator, and a divider, said divider being connected to the clock generator, to the third counter, and to the second counter of the second processing unit; the second register being connected to the third counter, to the third comparator, to the first register, and to the second counter; and the third comparator being connected to the clock generator.

3. The apparatus as claimed in claim 2, wherein the first processing unit comprises a second presetter and a further comparator being connected together, to the first counter, and to the first comparator and to the first automatically actuated valve in said first pipe.

4. The apparatus as claimed in claim 2, wherein said third pipe is provided downstream of the second flowmeter with an automatically actuated three-way valve terminating in a tubular-structure, said three-way valve being connected to the first comparator delivering the medium into the said tubular structure when said first automatically actuated valve in said first pipe is open.

5. The apparatus as claimed in claim 2, wherein the first flowmeter is an oval gear meter.

6. The apparatus as claimed in claim 2, wherein the first flowmeter is an annular piston meter.

7. The apparatus as claimed in claim 2, wherein the second flowmeter is a Venturi tube, and wherein an analog pulse converter is provided between the Venturi tube and the second counter of the second processing unit.

8. The apparatus as claimed in claim 2, wherein the second flowmeter is an orifice, and wherein an analog pulse converter is provided between the orifice and the second counter of the second processing unit.

* * * * *

UNITED STATES PATENT AND TRADEMARK OFFICE
CERTIFICATE OF CORRECTION

PATENT NO. : 3,933,038
DATED : January 20, 1976
INVENTOR(S) : Hans Wilhelm Valentin It is certified that error appears in the above—identified patent and that said Letters Patent are hereby corrected as shown below:

Column 5, line 49, before "storing" insert -- comprising --

Signed and Sealed this eighteenth Day of May 1976

[SEAL]

Attest:

RUTH C. MASON
Attesting Officer

C. MARSHALL DANN
Commissioner of Patents and Trademarks